Dec. 3, 1929. A. T. KASLEY 1,738,251
GEARING
Filed March 31, 1927 2 Sheets-Sheet 1

WITNESSES:
E. Lutz

INVENTOR
A.T. Kasley
BY
A. B. Reavis
ATTORNEY

Dec. 3, 1929.  A. T. KASLEY  1,738,251
GEARING
Filed March 31, 1927  2 Sheets-Sheet 2

WITNESSES:
E. Lutz

INVENTOR
A. T. Kasley
BY
A. B. Reeves
ATTORNEY

Patented Dec. 3, 1929

1,738,251

UNITED STATES PATENT OFFICE

ALEXANDER T. KASLEY, OF MOORES, PENNSYLVANIA, ASSIGNOR TO WESTINGHOUSE ELECTRIC & MANUFACTURING COMPANY, A CORPORATION OF PENNSYLVANIA

GEARING

Application filed March 31, 1927. Serial No. 179,765.

My invention relates to gearing, more particularly to a type which is peculiarly suitable for connecting crank shafts of prime movers to driven members, and it has for an object to provide apparatus of this character which shall operate quietly and have the elements thereof transmit and apply torque more uniformly or positively to a driven member.

In gearing a plurality of crank shafts of internal combustion engine means, such as disclosed and claimed in our application Serial No. 179,814, filed March 31, 1927 (Case 6644), and assigned to the Westinghouse Electric & Manufacturing Company, it is desirable that backlash shall be avoided and that the gearing shall be relieved of torsional vibration. With the avoidance of backlash and the maintenance of positive torque values on all of the gear elements of the gearing, gearing is provided which runs quietly, which is not subject to vibration, and which drives the driven element in a highly satisfactory manner. The objectives of maintaining positive torque values on the driving gear elements and of avoiding backlash are accomplished by the employment of improved gear constructions in connection with the crank shafts, these gear constructions constituting the gearing elements associated with the crank shafts and disposed in meshing relation with respect to the gearing leading to the driven element. Each gear construction disposed in coaxial relation with respect to a crank shaft embodies first and second gear members, the first gear member being connected to its crank shaft by torsional vibration absorption means and the second gear member being connected to the first gear member by tension means. The effect of the torsional vibration absorption means is to avoid or to minimize the transmission of torsional vibrations from a crank shaft to the associated first gear member. Since the second gear member, just referred to, is connected to the remainder of the gearing, and since the first and second gear members have tension means arranged therebetween, during periods of negative torque of each crank shaft, the associated tension means is effective to maintain the torque of the associated first gear positive in order to avoid backlash. This arrangement is particularly desirable and effective where a multiplicity of crank shafts are geared to the same driven member and where the crank shaft torque values differ in phase. Hence, it will be seen that I have provided gearing which prevents or minimizes the imposition of torsional vibrations thereon and which is effective to transmit positive torque values at all times.

These and other objects are effected by my invention as will be apparent from the following description, taken in connection with the accompanying drawings, forming a part of this application, in which.

Figure 1:
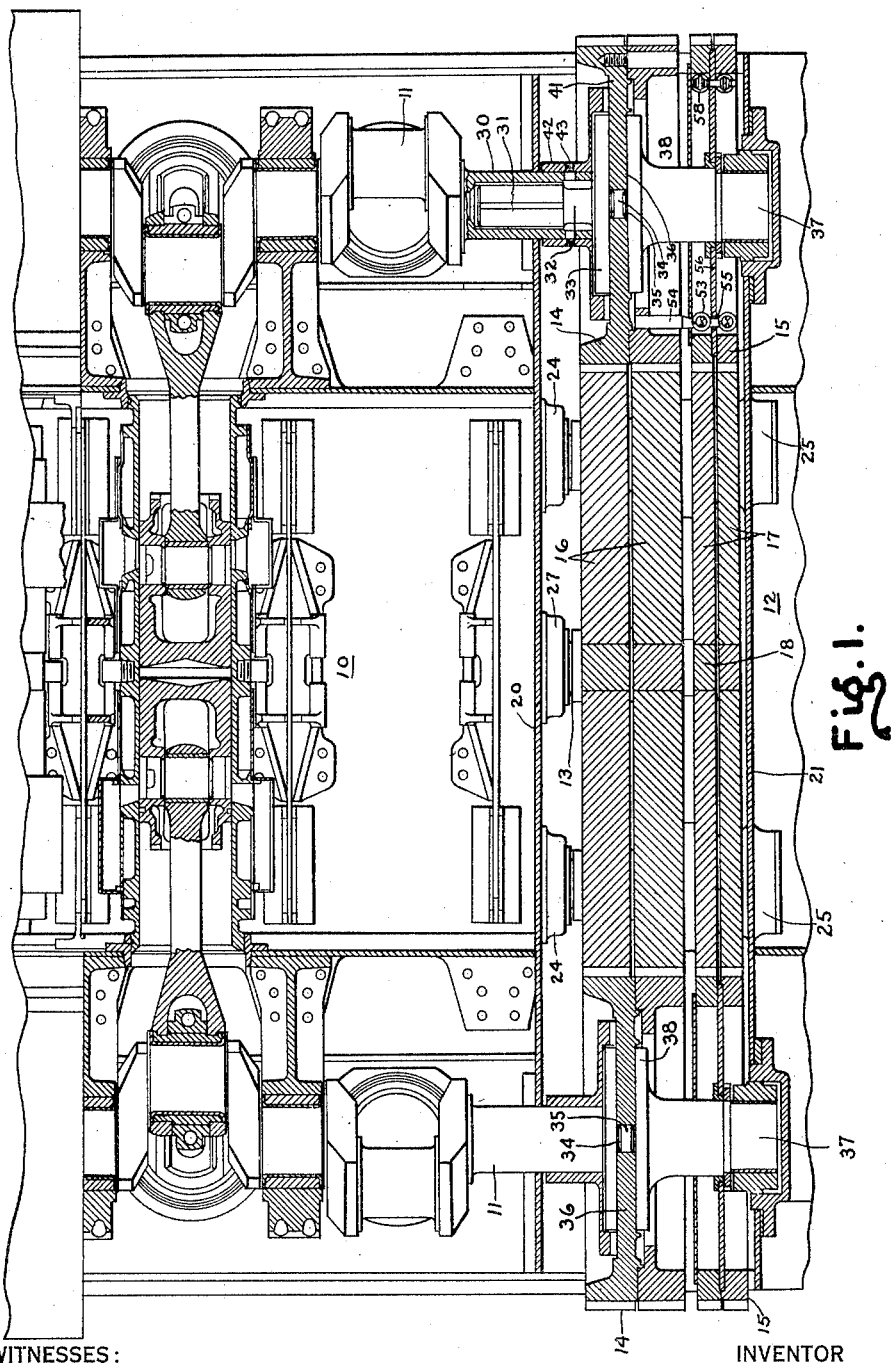
Fig. 1 is a fragmentary view of engine means showing my improved gearing applied thereto.
Figure 2:
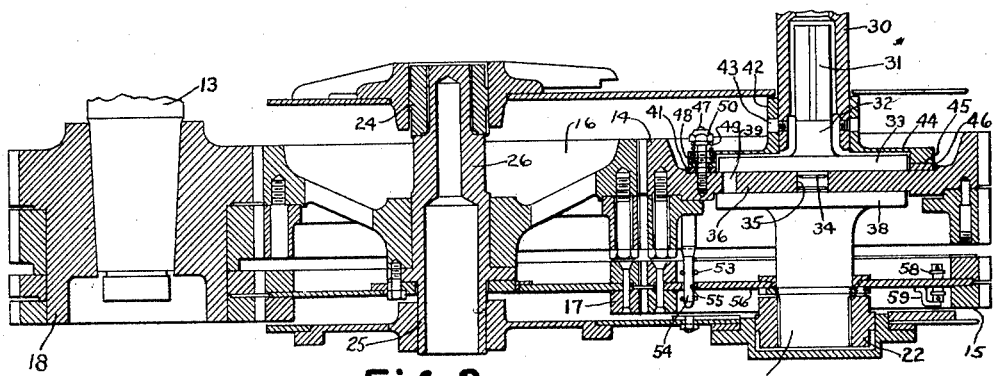
Fig. 2 is a sectional view of one of the crank shaft gear constructions and cooperating gearing.
Figure 3:
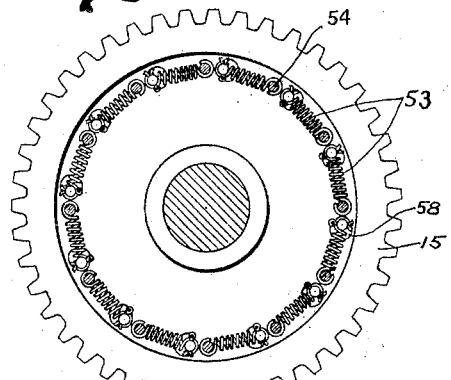
Fig. 3 is a side view of a crank shaft anti-backlash gear.
Figure 4:
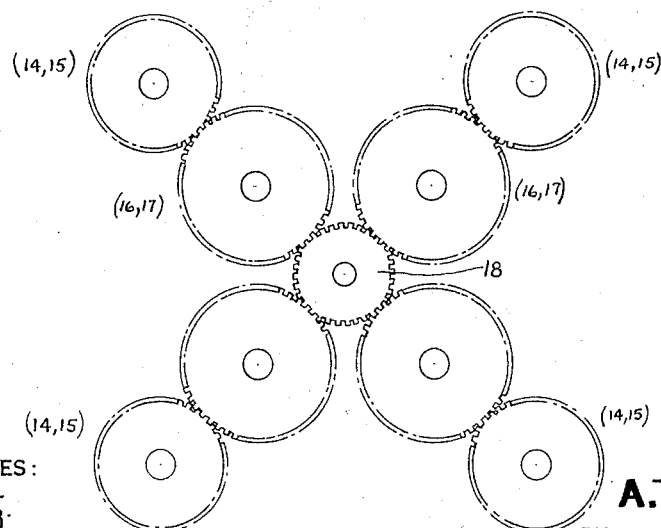
Fig. 4 is a diagrammatic view showing one arrangement of my improved gearing.

Referring now to the drawings for a better understanding of my invention, I show engine means, at 10, for example, internal combustion engine means of the opposed-piston type, employing a plurality of crank shafts 11. The crank shafts are connected by gearing, at 12, to the driven member or shaft 13.

With an internal combustion engine crank shaft, in view of the fact that application of power thereto is not continuous and uniform and owing to unavoidable constructional and operational characteristics, torsional vibrations are set up. Also, due to the fact that each cylinder is part of the time delivering power and part of the time absorbing power, the associated crank shaft is subject to positive and negative torques. I have provided gearing, at 12, which is so arranged that torsional vibrations are very largely, if not completely, absorbed, thereby avoiding such vibrations from being imposed on the gearing to any substantial extent. The factor of positive and negative torque values of each crank shaft would result in noisy operation unless the special anti-backlash apparatus, hereinafter more fully referred to, was employed. Hence, it will be seen that the torsional vibration absorption means and the anti-backlash means cooperate to produce a gearing system which is quiet in operation and which transmits power more uniformly even though the crank shafts have positive and negative torque values and are subject to torsional vibration.

Referring now to the gearing, at 12, I show crank shaft gearing constructions, consisting of first and second gears 14 and 15, respectively, and associated with each crank shaft 11 of the engine means. Each of the first and second gears 14 and 15 mesh with intermediate idlers 16 and 17 and the idler gear members 16 and 17 mesh with a common driven gear construction 18 carried by the driven shaft 13.

As shown on the drawing, the gearing is disposed between the housing members or plates 20 and 21 provided with bearings 22 for the crank shafts 11, bearings 24 and 25 for stub shafts 26 for the intermediate or idler gear members 16 and 17, and a bearing 27 for the driven shaft 13 and its connected gear member 18.

Referring first to the torsional vibration absorption means, this is embodied as a coupling arrangement between each shaft gear member 14 and its associated crank shaft 11. To this end, each crank shaft preferably has a terminal hollow portion 30 within which is keyed the portion 31 of a stub shaft, the latter having a neck portion 32 joined to a flange 33 and the flange preferably having on its face a centering lug 34 to engage in a centering opening 35 in the web 36 of the first gear member 14. On the opposite side of the web 36, there is located an elongated journal member 37 having a flange 38 disposed in opposed relation with respect to the flange 33 and having the web portion 36 of the gear member 14 disposed therebetween and connected thereto, the connection being preferably by cross pins, bolts or keys 39.

Outwardly of the flange 33, the web 36 is provided with a bearing surface 41. A hub 42 surrounds the hollow portion 30 and is keyed thereto by any suitable means 43, the hub being provided with a radially-extending flange 44 having an annular bearing face 45 disposed in opposed relation with respect to said bearing face 41 of the web portion. Friction material 46 of any suitable character is interposed between the bearing surfaces 41 and 45. Stud bolts 47 carried by the web portions 36 extend through suitable openings in the friction material 46, and through openings 48 in the flange portion 44, springs 49 being disposed about said stud bolts 47 and each having one end bearing against the flange portion 44 and the other end bearing against an adjustable nut 50 carried by the outer end of each stud bolt 47.

With this construction, each gear member 14 is positively connected to its crank shaft 11 only through the stub shaft having the reduced portion 32, thereby providing a torsionally yieldable connection. On the other hand, the rigid construction of hub 42 and flange 44 is connected to the gear member 14 through adjustable braking apparatus. Therefore, if there is torsional vibration of a crank shaft, the neck portion 32 permits of relative yielding between the gear element 14 and the crank shaft; and, while the hub 42 and the flange 44 offer a fairly rigid construction, nevertheless the connection thereof to the gear member is not positive but only through the braking apparatus described. Hence, the combined effect of the torsionally yieldable means and of the braking means is to iron out or dampen torsional vibrations in so far as the gear member 14 is concerned, thereby causing the first gear members 14 to be driven fairly uniformly and with negligible torsional vibration effects.

As already pointed out, the operation of the engine means results in each crank shaft being subject to positive and negative torque values; and, unless this was taken into account in some way, the gearing would be quite noisy owing to stress reversal and the necessary gearing clearances. To this end, I provide, in coaxial relation with respect to the first gears 14, the second gears 15, the latter gears being mounted so as to be capable of angular movement with respect to the first gears. The second gears 15 mesh with the intermediate idler gears 17 freely mounted on the stub shafts 26. Both the power transmitting idlers 16 and the anti-backlash train idlers 17 mesh with a common driven gear construction 18.

Referring now to the particular means for maintaining the torque of the first gear 14 positive at all times, I show each first gear 14 connected by suitable spring means, at 53, to its associated second gear 15. Assuming that the gearing is assembled and that the spring means is under initial tension, then the tendency of such spring means would be to cause the first and second gears 14 and 15 to move angularly in opposite directions, however, as the backlash train is restrained by the load, the effect of the spring means is a positive torque on each gear member. The effect of the spring means, therefore, is to impose positive torque values at all times on the driving gears 14 even though the associated crank shafts pass through phases of negative torque.

Each spring means preferably takes the form of lateral pins 54 projecting from the gear member 14 and passing through openings 55 provided in the web member 56 of the second gear member 15, each of these pins being connected by springs 57 on opposite sides of the web 56 with eccentric pins 58. In assembling, the gears are first brought into meshing relation and thereafter the eccentric pins 58 are adjusted to place all of the springs under initial tension. The pins 58 are held in adjusted positions by any suitable retaining means 59. Since the idler gears are geared to the load, the tension of the springs constitutes a positive torque applied to the gears 14.

From the foregoing, it will be apparent that I have devised a gearing system which is provided with cooperating torsional vibration absorption means and means for preventing backlash, whereby power may be transmitted more uniformly and with a minimum of noise from driving to driven members, this transmission mechanism being particularly useful where a plurality of driving elements, such as internal combustion engine crank shafts, are to be geared to a common driven element.

While I have shown my invention in one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination of an engine crank shaft, a driven member, gearing between the crank shaft and the driven member including first and second gears coaxially related with respect to the crank shaft, torsional vibration absorption means for coupling the first gear to the crank shaft, means for mounting the second gear so as to be capable of angular movement with respect to the axis of said crank shaft, and anti-backlash means for the gearing including energy absorbing means disposed between the first and second gears for exerting torque on the first gear in the direction of normal rotation thereof during intervals of negative torque of the crank shaft.

2. The combination of a driven element, a driving element, and gearing between the elements including first and second gear members coaxial with respect to the driving element, a torsionally yieldable connection between the first gear member and the driving element, braking means between the driving element and the first gear member, and yieldable means connected to the first and second gear members and arranged to exert torque on the first gear member in the direction of normal rotation thereof.

3. The combination of a driven member, a plurality of driving members, gearing interposed between the driving members and the driven member and including first and second gears coaxially related with respect to each driving member, torsional vibration absorbing means for connecting each first gear to its driving member, and yieldable means for connecting each pair of first and second gears.

4. The combination of a driving member having a hollow terminal portion, a radial flange secured to the driving member, a first gear, a stub shaft member keyed interiorly of said hollow terminal portion and connected to said gear, said stub shaft member having a neck portion adjacent to said gear, adjustable braking means between the flange and the web of said gear, a second gear coaxial with the first gear and capable of angular movement relative thereto, lateral pins carried by the first gear, and springs for connecting the pins to said second gear.

5. The combination of a driving member having a hollow terminal portion, a gear member provided with a web face, a stub shaft connected to the interior of the hollow portion and to the gear member and having a portion of smaller diameter arranged between the connecting portion and the gear member, an element secured to the driving member and having an annular face disposed in opposed relation with respect to said web face, a friction member between said faces, and means for clamping the frictional member between said faces.

6. The combination of a driving member having a hollow terminal portion, a gear member provided with a web face, a stub shaft connected to the interior of the hollow portion and to the gear member and having a portion of smaller diameter arranged between the connecting portion and the gear member, an element secured to the driving member and having an annular face disposed in opposed relation with respect to said web face, braking material between the opposed faces, and means for causing the braking material to be gripped between said faces.

7. The combination of a driving member having a hollow terminal portion, a gear member provided with a web face, a stub shaft connected to the interior of the hollow portion and to the gear member and having a portion of smaller diameter arranged between the connecting portion and the gear member, an element secured to the driving member and having an annular face disposed in opposed relation with respect to said web face, braking material between said faces, and spring means for causing the braking material to be gripped between said faces.

8. The combination of a driving member having a hollow terminal portion, a gear member provided with a web face, a stub shaft connected to the interior of the hollow portion and to the gear member and having a portion of smaller diameter arranged between the connecting portion and the gear member, an element secured to the driving member and having an annular face disposed in opposed relation with respect to said web face, braking material between said faces, and adjustable spring means for causing said braking material to be gripped between said faces.

9. The combination of a driving member, a driven member, and means for transmitting power from the driving member to the driven member including a pair of gears carried by the driving member, one of said gears being connected to the driving member while the other of said gears is capable of relative angular movement with respect to said first gear, a pair of idler gears meshing respectively with the driving member gears, a gear carried by the driven member and meshing with the idler gears, and spring means interposed between the driving member gears and effective normally to exert torque on the gear which is connected to the driving member.

10. The combination of a driving member, a driven member, and power transmission gearing between the driving and driven members including a pair of first and second gears carried by the driving member, the first gear being connected to the driving member while the second gear is capable of relative angular movement with respect to the first gear, first and second idler gears capable of relative angular movement and meshing respectively with the first and second driving member gears, a driven gear carried by the driven member and meshing with the first and second idler gears, and yieldable means interposed between the first and second driving member gears for exerting positive torque on the first gear thereof in its direction of normal rotation.

11. The combination of a variable torque driving member, a driven member, first and second gears coaxially related with respect to the driving member and capable of relative angular movement, torsional vibration absorbing means for connecting the driving member to the first gear, first and second idler gears meshing respectively with the first and second driving member gears, a driven gear meshing with the first and second idler gears, and spring means interposed between the first and second driving member gears for exerting positive torque on the first driving member gear in the direction of normal rotation thereof.

12. In apparatus of the character described, the combination of a plurality of crank shafts, a driven shaft, and power transmitting gearing between all of the crank shafts and driven shaft including first and second gears carried by each of the crank shafts and capable of relative angular movement, first and second idler gears capable of relative angular movement and meshing respectively with the first and second crank shaft gears, a driven gear meshing with the idler gears, torsional vibration absorption means for connecting the crank shafts to the first crank shaft gears, and spring means connecting the first and second crank shaft gears and exerting torques on the first crank shaft gears in the directions of normal rotation thereof.

13. The combination with a driven device and a variable torque driving member, of power transmission gearing between the driving member and the driven device including coaxially disposed first and second gears associated with the driving member, torsional vibration damping means for coupling the first gear to the driving member, means for mounting the second gear so as to be capable of angular movement relative to the first gear, and yieldable connecting means interposed between the first and second gears and arranged to impose a positive torque upon the first gear at all times.

In testimony whereof, I have hereunto subscribed my name this 22nd day of March, 1927.

ALEXANDER T. KASLEY.